(12) United States Patent
Tsutsui

(10) Patent No.: US 10,716,009 B2
(45) Date of Patent: Jul. 14, 2020

(54) APPARATUS, METHOD, AND SYSTEM RELATING TO MINIMIZATION OF DRIVE TESTS (MDT) MEASUREMENTS

(71) Applicant: NEC CORPORATION, Tokyo (JP)

(72) Inventor: Takahiro Tsutsui, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 30 days.

(21) Appl. No.: 15/752,975

(22) PCT Filed: Sep. 6, 2016

(86) PCT No.: PCT/JP2016/076132
§ 371 (c)(1),
(2) Date: Feb. 15, 2018

(87) PCT Pub. No.: WO2017/043475
PCT Pub. Date: Mar. 16, 2017

(65) Prior Publication Data
US 2018/0249340 A1 Aug. 30, 2018

(30) Foreign Application Priority Data

Sep. 11, 2015 (JP) .................................. 2015-179924

(51) Int. Cl.
*H04W 16/18* (2009.01)
*H04W 24/10* (2009.01)
(Continued)

(52) U.S. Cl.
CPC .......... *H04W 16/18* (2013.01); *H04W 24/10* (2013.01); *H04W 72/042* (2013.01);
(Continued)

(58) Field of Classification Search
None
See application file for complete search history.

(56) References Cited

U.S. PATENT DOCUMENTS 8,594,657 B2 * 11/2013 Wu ........................ H04W 24/10
455/423
9,380,483 B2 * 6/2016 Wu ........................ H04W 24/10
(Continued)

FOREIGN PATENT DOCUMENTS

| EP | 2398270 A2 * | 12/2011 | ............ H04W 24/10 |
| JP | 2014-207714 A | 10/2014 | |
| WO | 2014/132686 A1 | 9/2014 | |

OTHER PUBLICATIONS

"3rd Generation Partnership Project; Technical Specification Group Radio Access Network; Evolved Universal Terrestrial Radio Access (E-UTRA); User Equipment (UE) radio transmission and reception (Release 12)" 3GPP TS 36.101, V12.7.0, Mar. 2015, 659 pgs.
(Continued)

*Primary Examiner* — Michael J Moore, Jr.
(74) *Attorney, Agent, or Firm* — Sughrue Mion, PLLC

(57) ABSTRACT

To enable more efficient collection of information for optimal area design targeting a downlink only cell. An apparatus in the present invention includes: an information acquisition unit configured to acquire reporting condition information regarding a condition of reporting performed by a terminal apparatus to a base station; and a communication processing unit configured to transmit the reporting condition information to the terminal apparatus. The reporting is reporting to be used for determining initiation or termination of Minimization of Drive Tests (MDT) measurements for a downlink only cell.

19 Claims, 8 Drawing Sheets

(51) Int. Cl.
*H04W 72/04* (2009.01)
*H04W 88/08* (2009.01)
*H04W 88/02* (2009.01)
*H04W 88/12* (2009.01)

(52) U.S. Cl.
CPC ............ *H04W 88/02* (2013.01); *H04W 88/08* (2013.01); *H04W 88/12* (2013.01)

(56) References Cited

U.S. PATENT DOCUMENTS

| | | | | |
|---|---|---|---|---|
| 9,532,255 | B2 * | 12/2016 | Schmidt | H04W 36/0022 |
| 9,668,154 | B2 * | 5/2017 | Chang | H04W 24/10 |
| 9,807,636 | B2 * | 10/2017 | Lee | H04W 24/10 |
| 10,020,902 | B2 * | 7/2018 | Kim | H04W 24/10 |
| 2011/0306345 | A1 * | 12/2011 | Wu | H04W 24/10 |
| | | | | 455/436 |
| 2012/0087314 | A1 | 4/2012 | Maeda et al. | |
| 2014/0128057 | A1 * | 5/2014 | Siomina | H04J 3/0685 |
| | | | | 455/423 |
| 2014/0295884 | A1 * | 10/2014 | Racz | H04W 24/00 |
| | | | | 455/456.1 |
| 2015/0341838 | A1 * | 11/2015 | Pinheiro | H04W 28/0231 |
| | | | | 455/449 |
| 2015/0373573 | A1 * | 12/2015 | Lee | H04W 24/10 |
| | | | | 370/329 |
| 2016/0007219 | A1 * | 1/2016 | Hapsari | H04W 24/10 |
| | | | | 370/252 |
| 2016/0269260 | A1 * | 9/2016 | Kazmi | H04L 1/0027 |
| 2017/0195906 | A1 * | 7/2017 | Dalsgaard | H04W 24/10 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3GPP TS 36.300 V12.5.0, Mar. 2015, 251 pgs.

"3rd Generation Partnership Project; Technical Specification Group Radio Access Network; Evolved Universal Terrestrial Radio Access (E-UTRA); Radio Resource Control (RRC); Protocol specification (Release 12)," 3GPP TS 36.331 V12.5.0, Mar. 2015, 445 pgs.

"Universal Mobile Telecommunications System (UMTS); LTE; Universal Terrestrial Radio Access (UTRA) and Evolved Universal Terrestrial Radio Access (E-UTRA); Radio measurement collection for Minimization of Drive Tests (MDT); Overall description; Stage 2 (3GPP TS 37.320 version 12.2.0 Release 12)," ETSI TS 137 320, V12.2.0, Sep. 2014, 27 pgs.

Vodafone, "Pcell support/exclusion request—follow up,"3GPP TSG RAN4 Meeting #75, R4-153491, Fukuoka, Japan, May 25-29, 2015, 20 pgs.

International Search Report for PCT/JP2016/076132, dated Nov. 29, 2016 (PCT/ISA/210).

Written Opinion dated Nov. 29, 2016 issued by the International Searching Authority in PCT/JP2016/076132.

* cited by examiner

APPARATUS, METHOD, AND SYSTEM RELATING TO MINIMIZATION OF DRIVE TESTS (MDT) MEASUREMENTS

CROSS REFERENCE TO RELATED APPLICATIONS

This application is a National Stage of International Application No. PCT/JP2016/076132 filed Sep. 6, 2016, claiming priority based on Japanese Patent Application No. 2015-179924, filed Sep. 11, 2015.

BACKGROUND

Technical Field

The present invention relates to an apparatus, a method, and a system relating to minimization of drive tests (MDT) measurements.

Background Art

There is a technique using aggregated multiple cells with the purpose of improving throughput of a user plane (U-plane) of user equipment (UE). This technique is called carrier aggregation (CA) and is disclosed in Non-Patent Literature 1 (NPL1).

In the recent years, there are more services targeting downlink (DL), which has led to a stronger desire for improvement in throughput of DL than in throughput of uplink (UL). In association with this, Band 29 and Band 32 are defined as downlink-dedicated bands in Non-Patent Literature 2 (NPL2). When UE is in a connected mode (or connected state), the cells in the downlink-dedicated bands are used as secondary cells but are not used as primary cells. In addition, the cells in the downlink-dedicated bands are DL only cells and are not the targets of cell selection or cell reselection performed when the UE is in an idle mode (or idle state).

Moreover, the MDT functionality is standardized in the LTE-Advanced of the Third Generation Partnership Project (3GPP). The MDT functionality is functionality of substituting drive tests with the purpose of reducing operation expenditure (OPEX). In MDT, coverage problems are detected by collecting, on the network side, information acquired from measurements by UE. This is disclosed in Non-Patent Literature 3 (NPL3). There are two techniques, Logged MDT and Immediate MDT, as techniques for measurements and collection relating to MDT. Logged MDT is a technique for causing UE in an idle mode to perform measurements and to report results of the measurements at the time of the UE entering a connected state. Immediate MDT is a technique for causing UE in a connected mode to perform measurements and to report results of the measurements. Note that radio resource control (RRC) procedures for these measurements are disclosed in Non-Patent Literature 4 (NPL4).

CITATION LIST

Non-Patent Literature

[NPL1] 3GPP TS 36.300 V12.5.0 (2015-03) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)

[NPL2] 3GPP TS 36.101 V12.7.0 (2015-03) 3rd Generation Partnership Project; Technical Specification Group Radio Access Network; Evolved Universal Terrestrial Radio Access (E-UTRA); User Equipment (UE) radio transmission and reception (Release 12)

[NPL3] 3GPP TS 37.320 V12.2.0 (2014-09) 3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 12)

[NPL4] 3GPP TS 36.331 V12.5.0 (2015-03) 3rd Generation Partnership Project; Technical Specification Group Radio Access Network; Evolved Universal Terrestrial Radio Access (E-UTRA); Radio Resource Control (RRC); Protocol Specification (Release 12)

SUMMARY

Technical Problem

As described above, each cell in the downlink-dedicated bands (e.g., Bands 29 and 32) defined in NPL2 is a DL only cell and is used as a secondary cell. Specifically, for example, a DL only cell is arranged in the coverage area of a cell used as a primary cell and is used as a secondary cell together with the primary cell. The primary cell and the secondary cell (i.e., DL only cell) are cells of the same evolved NodeB (eNB).

The coverage of secondary cell may extend to the area that is outside the coverage of the primary cell and is in the coverage of another cell (cell of another eNB). The area in the coverage of the secondary cell is an unavailable coverage, and an unnecessary coverage. Such an unavailable coverage (or unnecessary coverage) may be a factor of interference with other cells. For optimal area design, it is desirable that information on such an unavailable coverage be collected using MDT.

However, UE may also perform measurements that is unnecessary for collection of information regarding unavailable coverage described above in Immediate MDT measurements. For example, the UE may also perform periodic measurements and/or measurements of an event trigger, and from a result of the measurements, perform measurements for an area away from the unavailable coverage described above. In this way, collection of information may become inefficient.

An example object of the present invention is to enable more efficient collection of information for optimal area design targeting a downlink only cell.

Solution to Problem

A first apparatus according to an example aspect of the present invention includes: an information acquisition unit configured to acquire reporting condition information regarding a condition of reporting performed by a terminal apparatus to a base station; and a communication processing unit configured to transmit the reporting condition information to the terminal apparatus. The reporting is reporting to be used for determining initiation or termination of Minimization of Drive Tests (MDT) measurements for a downlink only cell.

A second apparatus according to an example aspect of the present invention includes: an information acquisition unit configured to acquire reporting condition information regarding a condition of reporting performed by a terminal apparatus to a base station, the reporting condition information being transmitted by the base station; and a reporting unit configured to perform reporting for a downlink only cell based on the reporting condition information. The reporting is reporting to be used for determining initiation or termination of MDT measurements for the downlink only cell.

A third apparatus according to an example aspect of the present invention includes: an information acquisition unit configured to acquire reporting condition information regarding a condition of reporting performed by a terminal apparatus to a base station; and a communication processing unit configured to transmit the reporting condition information to the base station. The reporting is reporting to be used for determining initiation or termination of MDT measurements for a downlink only cell.

A first method according to an example aspect of the present invention includes: acquiring reporting condition information regarding a condition of reporting performed by a terminal apparatus to a base station; and transmitting the reporting condition information to the terminal apparatus. The reporting is reporting to be used for determining initiation or termination of MDT measurements for a downlink only cell.

A second method according to an example aspect of the present invention includes: acquiring reporting condition information regarding a condition of reporting performed by a terminal apparatus to a base station, the reporting condition information being transmitted by the base station; and performing reporting for a downlink only cell based on the reporting condition information. The reporting is reporting to be used for determining initiation or termination of MDT measurements for the downlink only cell.

A third method according to an example aspect of the present invention includes: acquiring reporting condition information regarding a condition of reporting performed by a terminal apparatus to a base station; and transmitting the reporting condition information to the base station. The reporting is reporting to be used for determining initiation or termination of MDT measurements for a downlink only cell.

A system according to an example aspect of the present invention includes: a base station configured to transmit, to a terminal apparatus, reporting condition information regarding a condition of reporting performed by the terminal apparatus to the base station; and the terminal apparatus configured to perform reporting for a downlink only cell based on the reporting condition information. The reporting is reporting to be used for determining initiation or termination of MDT measurements for the downlink only cell.

A fourth method according to an example aspect of the present invention includes: transmitting, from a base station to a terminal apparatus, reporting condition information regarding a condition of reporting performed by the terminal apparatus to the base station; and performing, in the terminal apparatus, reporting for a downlink only cell based on the reporting condition information. The reporting is reporting to be used for determining initiation or termination of MDT measurements for the downlink only cell.

Advantageous Effects of Invention

According to the present invention, it is possible to more efficiently collect information for optimal area design targeting a downlink only cell. Note that the present invention may exert other advantageous effects instead of the above advantageous effects or together with the above advantageous effects.

DESCRIPTION OF THE EMBODIMENTS

Figure 1:
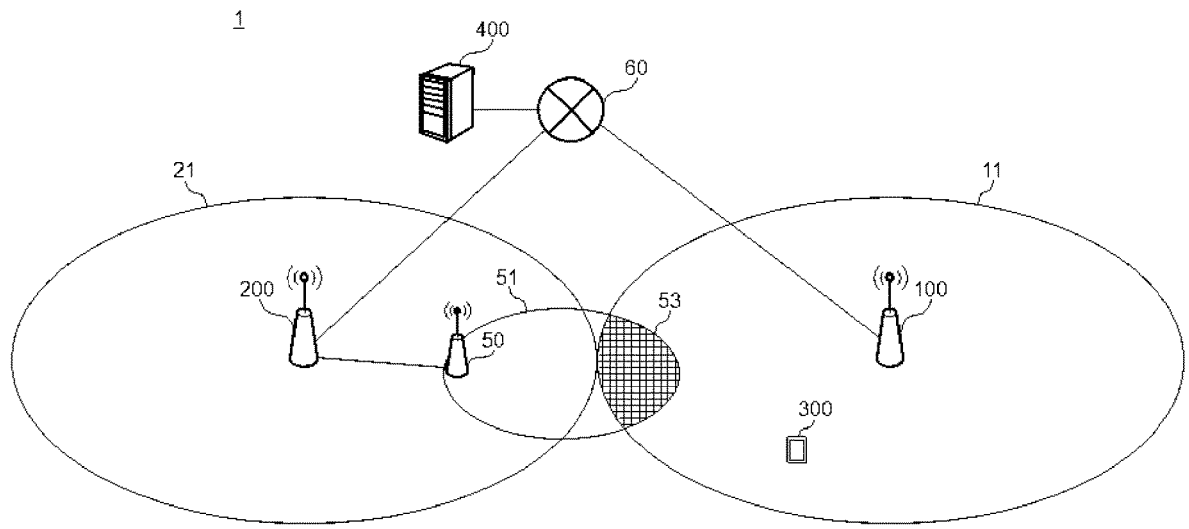
FIG. 1 is an explanatory diagram illustrating an example of a schematic configuration of a system according to exemplary embodiments of the present invention.

Details of exemplary embodiments of the present invention will be described below with reference to the accompanying drawings. Note that, in the present description and drawings, elements to which similar descriptions are applicable may be denoted by the same reference signs, whereby overlapping descriptions may be omitted.

Descriptions will be given in the following order.
1. Related Art
2. Overview of Exemplary Embodiments of the Present Invention
3. Example of Configuration of System
4. First Exemplary Embodiment
   4.1. Example of Configuration of Base Station
   4.2. Example of Configuration of Neighbor Base Station
   4.3. Example of Configuration of Terminal Apparatus
   4.4. Example of Configuration of Network Node 4.5. Technical Features
5. Second Exemplary Embodiment
5.1. Example of Configuration of Base Station
5.2. Example of Configuration of Terminal Apparatus
5.3. Technical Features 1. Related Art As a technique relating to exemplary embodiments of the present invention, carrier aggregation (CA) and minimization of drive tests (MDT) are described.

(1) Carrier Aggregation (CA)

In the LTE-Advanced of the Third Generation Partnership Project (3GPP), evolved NodeBs (eNBs) configure evolved universal terrestrial radio access (E-UTRAN). In addition, recently, heterogeneous network (HetNet) environment is formed by various cells. For example, it is conceivable to configure a macro cell, which has a large coverage, and a small cell, which has a small coverage. The small cell may be a micro cell, a pico cell, or a femto cell, or may be a cell of another kind that is smaller than a macro cell.

There is a technique using aggregated multiple cells with the purpose of improving throughput of a user plane (U-plane) of user equipment (UE). This technique is called carrier aggregation (CA) and is disclosed in NPL 1 (3GPP TS 36.300 V12.5.0). For example, carrier aggregation is employed in environment including multiple cells having different frequencies and overlapping coverages (Het-Net environment). Note that the multiple cells are cells of the same eNB (i.e., intra-eNB cells).

Multiple cells aggregated through CA include one primary cell (PCell) used for communication in the user plane and a control plane (C-plane) and one or more secondary cells (SCells) (four secondary cells at maximum) used for communication in the user plane. Note that the larger the number of aggregated cells is, the higher the throughput may become.

In the recent years, there are more services targeting downlink (DL), which has led to a stronger desire for improvement in throughput of DL than in throughput of uplink (UL). In association with this, Band 29 and Band 32 are defined as downlink-dedicated bands in NPL 2 (3GPP TS 36.101 V12.7.0). When the UE is in a connected mode (or connected state), the cells in the downlink-dedicated bands are used as secondary cells but are not used as primary cells. In addition, the cells in the downlink-dedicated bands are not the targets of cell selection and cell reselection performed when the UE is in an idle mode (or idle state). For this reason, the UE is not able to camp on any cell in the downlink-dedicated bands.

In CA, control of handover (HO) in the connected mode is control for switching between primary cells. When the primary cell before HO (i.e., old primary cell) and the primary cell after HO (i.e., new primary cell) are cells of the same eNB (i.e., intra-eNB cells), secondary cell(s) may be usable continuously. On the other hand, when the primary cell before HO (i.e., old primary cell) and the primary cell after HO (i.e., new primary cell) are cells of different eNBs (i.e., inter-eNB cells), secondary cells are not usable continuously.

(2) Minimization of Drive Tests (MDT)

The MDT functionality is standardized in the LTE-Advanced of the 3GPP. The MDT functionality is functionality of substituting drive tests with the purpose of reducing operation expenditure (OPEX).

In MDT, information acquired as a result of measurements by UE is collected on the network side to detect coverage problems relating to coverage hole/weak coverage, pilot pollution/overshoot coverage/coverage mapping/UL coverage/cell boundary mapping/coverage mapping for pico cell in CA scenario, and the like. This is disclosed in NPL 3 (3GPP TS 37.320 V12.2.0).

Examples of techniques for measurements and collection relating to MDT include two techniques, Logged MDT and Immediate MDT.

Logged MDT is a technique for causing UE in the idle mode to perform measurements and to report results of the measurements at the time of the UE entering a connected state. The UE performs periodic measurements only in a "camped normally" state. For example, these measurements include reference signal received power (RSRP) and/or reference signal received quality (RSRQ) measurements as well as measurements of the location of the UE. For example, the location measurements use the global navigation satellite system (GNSS).

Immediate MDT is a technique for causing UE in the connected mode to perform measurements and to report results of the measurements. The UE performs periodic measurements and/or event-triggered measurements. For example, these measurements include RSRP and/or RSRQ measurements as well as measurements of the location of the UE. For example, the location measurements use the GNSS.

Note that radio resource control (RRC) procedures for these measurements are disclosed in NPL 4 (3GPP TS 36.331 V12.5.0).

2. Overview of Exemplary Embodiments of the Present Invention

An overview of exemplary embodiments of the present invention is described.

(1) Technical Problem

The cell in the downlink-dedicated band (e.g., Bands 29 and 32) is a DL only cell and is used as a secondary cell. Specifically, for example, DL only cell is arranged in the coverage area of a cell used as a primary cell and is used as a secondary cell together with the primary cell. The primary cell and the secondary cell (i.e., DL only cell) are cells of the same evolved NodeB (eNB).

The coverage of secondary cell may extend to the area that is outside the coverage of the primary cell and is in the coverage of another cell (cell of another eNB). The area in the coverage of the secondary cell is an unavailable coverage, and an unnecessary coverage. Such an unavailable coverage (or unnecessary coverage) may be a factor of interference with other cells. For optimal area design, it is desirable that information on such an unavailable coverage be collected using MDT.

However, UE may also perform measurements that are unnecessary for collection of information regarding unavailable coverage described above in Immediate MDT measurements. For example, the UE may also perform periodic measurements and/or event-triggered measurements, and from a result of the measurements, perform measurements for an area away from the unavailable coverage described above. In this way, collection of information may become inefficient.

(2) Technical Features

In the exemplary embodiments of the present invention, in order to solve the above-described technical problem, an eNB, for example, causes UE located in a coverage of a cell of the eNB to perform reporting (e.g., measurement reporting) for determining initiation/termination of the MDT measurements for the DL only cell (cell of another eNB).

Specifically, the eNB transmits, to the UE, information regarding a condition of the reporting (e.g., a threshold to be compared with the measurement values of the DL only cell). The UE then performs the reporting (e.g., measurement reporting) for the DL only cell on the basis of the information (e.g., the threshold).

With these processes, for example, the UE initiates the MDT measurements at the timing of entering the coverage of the DL only cell (i.e., unavailable coverage), and/or terminates the MDT measurements at the timing of moving out of the coverage of the DL only cell (i.e., unavailable coverage). Therefore, the information regarding the unavailable coverage may be collected efficiently.

3. Example of Configuration of System

With reference to FIG. 1, an example of a configuration of a system 1 according to the exemplary embodiments of the present invention is described. FIG. 1 is an explanatory diagram illustrating an example of a schematic configuration of the system 1 according to the exemplary embodiments of the present invention. With reference to FIG. 1, the system 1 includes a base station 100, a neighbor base station 200, a terminal apparatus 300, and a network node 400. The base station 100, the neighbor base station 200, and the network node 400 communicate with each other through a network 60. For example, the network 60 includes a backhaul and a core network.

The system 1 may be a system conforming to the standards of the Third Generation Partnership Project (3GPP). More specifically, the system 1 may be a system conforming to the Long Term Evolution (LTE)/LTE-Advanced, and/or System Architecture Evolution (SAE). The system 1 is, of course, not limited to these examples.

(1) Base Station 100

The base station 100 is a node in a radio access network (RAN) and performs radio communication with a terminal apparatus (e.g., the terminal apparatus 300) located in a coverage 11. For example, the base station 100 is an eNB.

(2) Neighbor Base Station 200

The neighbor base station 200 is a node in a radio access network (RAN) and performs radio communication with a terminal apparatus (e.g., the terminal apparatus 300) located in a coverage 21. The neighbor base station 200 is a base station neighboring the base station 100. For example, the neighbor base station 200 is also an eNB.

Furthermore, the neighbor base station 200 uses a small cell having a coverage 51 in addition to a cell having the coverage 21 (macro cell). In other words, a small cell (of the neighbor base station 200) having the coverage 51 overlapping the coverage 21 is configured. The small cell may be a micro cell, a pico cell, or a femto cell, or may be a cell of another kind that is smaller than a macro cell. For example, the neighbor base station 200 includes a remote unit 50, and the remote unit 50 configures the small cell. The remote unit 50 may be a remote radio head (RRH) or a remote radio unit (RRU), or may be a unit that also performs physical-layer processing.

In particular, the small cell having the coverage 51 is a downlink only cell and is used as a secondary cell without being used as a primary cell. For example, the neighbor base station 200 uses the cell (e.g., macro cell) having the coverage 21 as a primary cell and the small cell having the coverage 51 as a secondary cell to thereby perform radio communication with terminal apparatuses located in the coverages of both of these cells.

Additionally, in particular, the coverage 51 of the small cell overlaps the coverage 11 of the cell (e.g., macro cell) of the base station 100. The small cell having the coverage 51 and the cell having the coverage 11 are cells of different base stations and are hence not usable in carrier aggregation, which means that the area 53 is an unavailable coverage (or unnecessary coverage) for the small cell.

Note that the neighbor base station 200 may use multiple small cells instead of one small cell only. In other words, multiple small cells of the neighbor base station 200 may be configured. In this case, an unavailable coverage may exist for each of the multiple small cells.

(3) Terminal Apparatus 300

The terminal apparatus 300 performs radio communication with a base station. For example, when the terminal apparatus 300 is located in the coverage 11 of the base station 100, the terminal apparatus 300 performs radio communication with the base station 100. For example, when the terminal apparatus 300 is located in the coverage 21 of the neighbor base station 200, the terminal apparatus 300 performs radio communication with the neighbor base station 200. For example, the terminal apparatus 300 is UE.

(4) Network Node 400

The network node 400 is a core network node and performs control relating to MDT. For example, the network node 400 is a mobility management entity (MME), a trace collection entity (TCE), and/or an EM. Alternatively, the network node 400 may be another core network node.

(5) MDT

In particular, in the exemplary embodiments of the present invention, the base station 100 and the terminal apparatus 300 support MDT. For example, the base station 100 makes configuration for MDT measurements, and the terminal apparatus 300 performs MDT measurements on the basis of the configuration. The MDT measurements include MDT measurements in the idle mode and/or MDT measurements in the connected mode. For example, the MDT measurements in the idle mode are Logged MDT measurements, and the MDT measurements in the connected mode are Immediate MDT measurements.

4. First Exemplary Embodiment

Next, a first exemplary embodiment of the present invention is described with reference to FIG. 2 to FIG. 10.

4.1. Example of Configuration of Base Station

Figure 2:
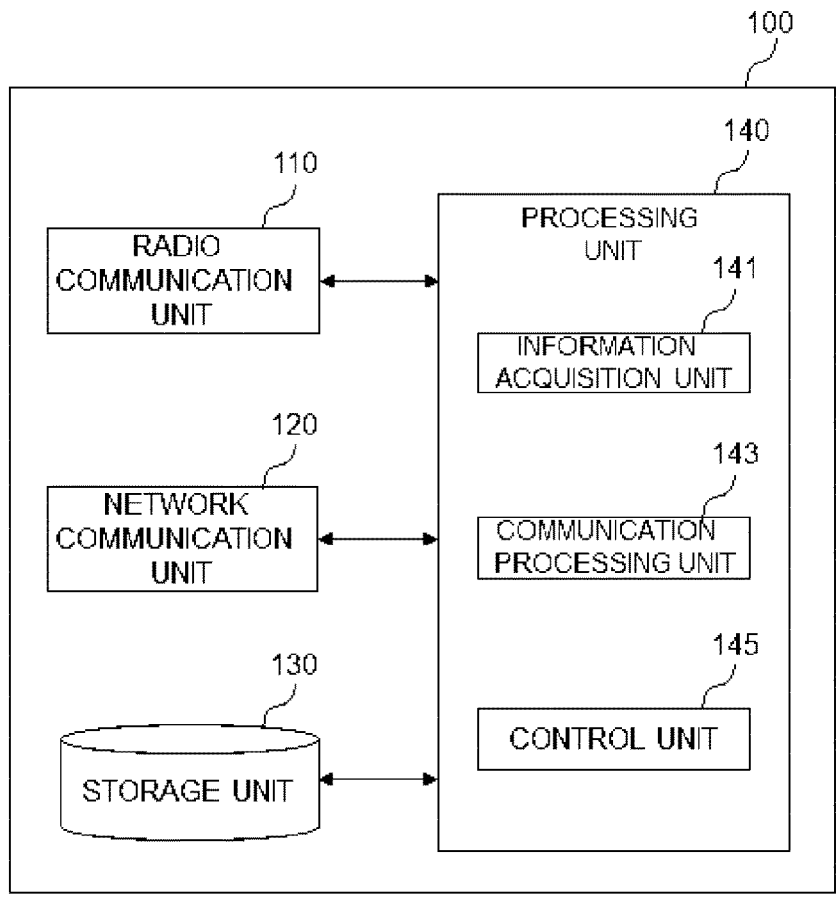
FIG. 2 is a block diagram illustrating an example of a schematic configuration of a base station according to a first exemplary embodiment.

First, with reference to FIG. 2, an example of a configuration of a base station 100 according to the first exemplary embodiment is described. FIG. 2 is a block diagram illustrating an example of a schematic configuration of the base station 100 according to the first exemplary embodiment. With reference to FIG. 2, the base station 100 includes a radio communication unit 110, a network communication unit 120, a storage unit 130, and a processing unit 140.

The radio communication unit 110 transmits and receives signals wirelessly. For example, the radio communication unit 110 receives signals from a terminal apparatus and transmits signals to the terminal apparatus.

The network communication unit 120 receives signals from a network 60 (e.g., backhaul) and transmits signals to the network 60 (e.g., backhaul).

The storage unit 130 temporarily or permanently stores programs and parameters for operations of the base station 100 as well as various data.

The processing unit 140 provides various functions of the base station 100. The processing unit 140 includes an information acquisition unit 141, a communication processing unit 143, and a control unit 145. Note that the processing unit 140 may further include other constituent components than these constituent components. In other words, the processing unit 140 may perform other operations than the operations of these constituent components.

Concrete operations of the information acquisition unit 141, the communication processing unit 143, and the control unit 145 will be described later in detail.

The radio communication unit 110 may include an antenna, a radio frequency (RF) circuit, and the like. The network communication unit 120 may include a network adapter, a network interface card, or the like. The storage unit 130 may include a memory (e.g., a nonvolatile memory and/or a volatile memory) and/or a hard disk, and the like. The processing unit 140 may include a baseband (BB) processor and/or another processor, and the like.

4.2. Example of Configuration of Neighbor Base Station

Figure 3:
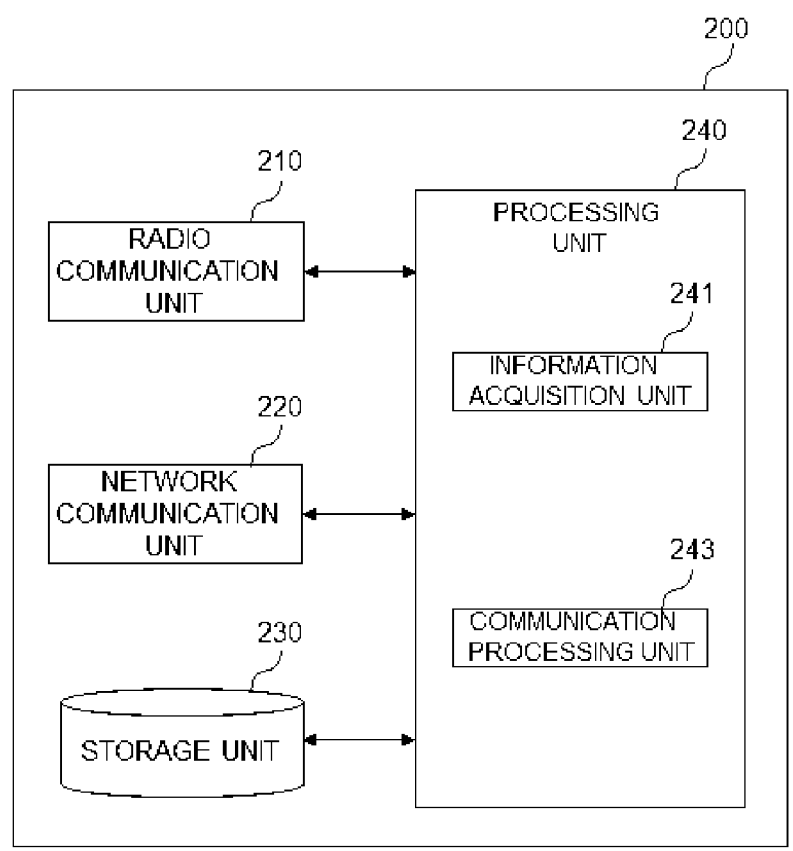
FIG. 3 is a block diagram illustrating an example of a schematic configuration of a neighbor base station according to the first exemplary embodiment.

First, with reference to FIG. 3, an example of a configuration of a neighbor base station 200 according to the first exemplary embodiment is described. FIG. 3 is a block diagram illustrating an example of a schematic configuration of the neighbor base station 200 according to the first exemplary embodiment. With reference to FIG. 3, the neighbor base station 200 includes a radio communication unit 210, a network communication unit 220, a storage unit 230, and a processing unit 240.

The radio communication unit 210 transmits and receives signals wirelessly. For example, the radio communication unit 210 receives signals from a terminal apparatus and transmits signals to the terminal apparatus.

The network communication unit 220 receives signals from a network 60 (e.g., backhaul) and transmits signals to the network 60 (e.g., backhaul).

The storage unit 230 temporarily or permanently stores programs and parameters for operations of the neighbor base station 200 as well as various data.

The processing unit 240 provides various functions of the neighbor base station 200. The processing unit 240 includes an information acquisition unit 241 and a communication processing unit 243. Note that the processing unit 240 may further include other constituent components than these constituent components. In other words, the processing unit 240 may perform other operations than the operations of these constituent components.

Concrete operations of the information acquisition unit 241 and the communication processing unit 243 will be described later in detail.

The radio communication unit 210 may include an antenna, a radio frequency (RF) circuit, and the like. The network communication unit 220 may include a network adapter, a network interface card, or the like. The storage unit 230 may include a memory (e.g., a nonvolatile memory and/or a volatile memory) and/or a hard disk, and the like. The processing unit 240 may include a baseband (BB) processor and/or another processor, and the like.

4.3. Example of Configuration of Terminal Apparatus

Figure 4:
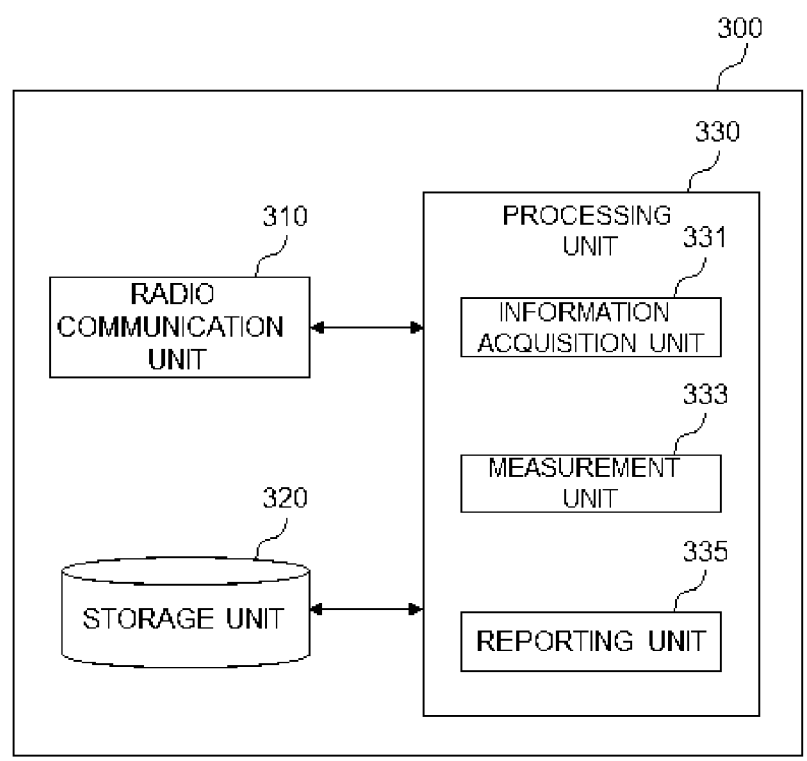
FIG. 4 is a block diagram illustrating an example of a schematic configuration of a terminal apparatus according to the first exemplary embodiment.

Next, with reference to FIG. 4, an example of a configuration of the terminal apparatus 300 according to the first exemplary embodiment is described. FIG. 4 is a block diagram illustrating an example of a schematic configuration of a terminal apparatus 300 according to the first exemplary embodiment. With reference to FIG. 4, the terminal apparatus 300 includes a radio communication unit 310, a storage unit 320, and a processing unit 330.

The radio communication unit 310 transmits and receives signals wirelessly. For example, the radio communication unit 310 receives signals from a base station and transmits signals to the base station.

The storage unit 320 temporarily or permanently stores programs and parameters for operations of the terminal apparatus 300 as well as various data.

The processing unit 330 provides various functions of the terminal apparatus 300. The processing unit 330 includes an information acquisition unit 331, a measurement unit 333, and a reporting unit 335. Note that the processing unit 330 may further include other constituent components than these constituent components. In other words, the processing unit 330 may perform other operations than the operations of these constituent components.

Concrete operations of the information acquisition unit 331, the measurement unit 333, and the reporting unit 335 will be described later in detail.

The radio communication unit 310 may include an antenna, a radio frequency (RF) circuit, and the like. The storage unit 320 may include a memory (e.g., a nonvolatile memory and/or a volatile memory) and/or a hard disk, and the like. The processing unit 330 may include a baseband (BB) processor and/or another processor, and the like.

4.4. Example of Configuration of Network Node

Figure 5:
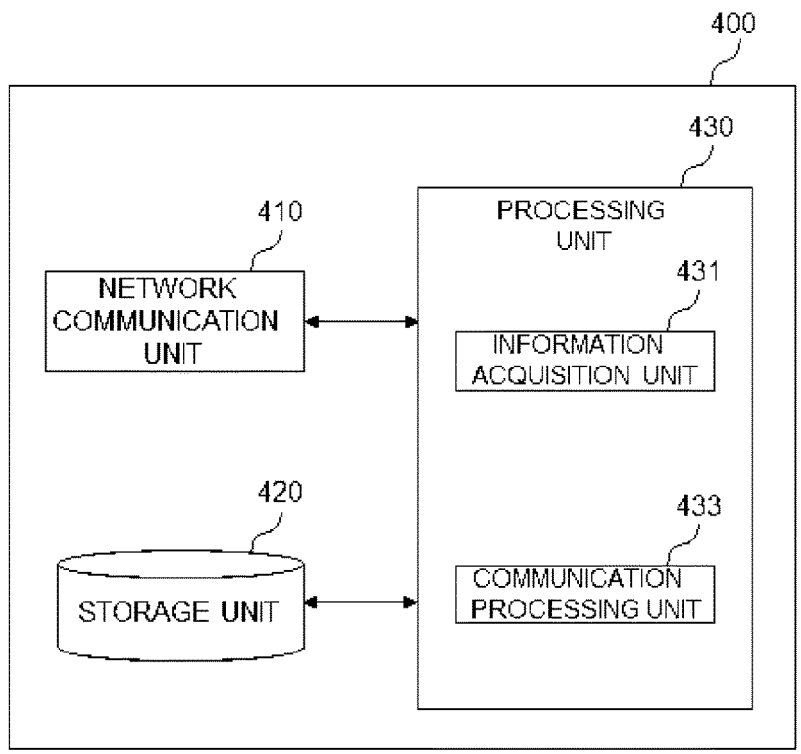
FIG. 5 is a block diagram illustrating an example of a schematic configuration of a network node according to the first exemplary embodiment.

Next, with reference to FIG. 5, an example of a configuration of the network node 400 according to the first exemplary embodiment is described. FIG. 5 is a block diagram illustrating an example of a schematic configuration of the network node 400 according to the first exemplary embodiment. With reference to FIG. 5, the network node 400 includes a network communication unit 410, a storage unit 420, and a processing unit 430.

The network communication unit 410 receives signals from the network 60 and transmits signals to the network 60.

The storage unit 420 temporarily or permanently stores programs and parameters for operations of the network node 400 as well as various data.

The processing unit 430 provides various functions of the network node 400. The processing unit 430 includes an information acquisition unit 431 and a communication processing unit 433. Note that the processing unit 430 may further include other constituent components than these constituent components. In other words, the processing unit 430 may perform other operations than the operations of these constituent components.

Concrete operations of the information acquisition unit 431 and the communication processing unit 433 will be described later in detail.

Note that the network communication unit 410 may include a network adapter, a network interface card, or the like. The storage unit 420 may include a memory (e.g., a nonvolatile memory and/or a volatile memory) and/or a hard disk, and the like. The processing unit 430 may include a processor and the like.

4.5. Technical Features

Next, technical features of the first exemplary embodiment are described with reference to FIG. 6 to FIG. 10.

(1) Determination of Initiation/Termination of MDT Measurements (1-1) Determination in Response to Reporting The base station 100 (information acquisition unit 141) acquires reporting condition information regarding a condition of reporting performed by the terminal apparatus 300 to the base station 100. The base station 100 (communication processing unit 143) then transmits the reporting condition information to the terminal apparatus 300. In particular, the reporting is reporting to be used for determining initiation or termination of the MDT measurements for the downlink (DL) only cell.

The terminal apparatus 300 (information acquisition unit 331) acquires the reporting condition information. The terminal apparatus 300 (reporting unit 335) performs reporting for the DL only cell based on the reporting condition information.

Furthermore, for example, the base station 100 (control unit 145) determines initiation or termination of the MDT measurements in response to the reporting.

(a) MDT Measurements

For example, the MDT measurements are MDT measurements in the connected mode (i.e., MDT measurements performed by the terminal apparatus 300 in the connected mode). More specifically, for example, the MDT measurements are Immediate MDT measurements.

(b) DL Only Cell

Band

For example, the DL only cell is a cell of a downlink-dedicated band. For example, the downlink-dedicated band is Band 29 or Band 32. The downlink-dedicated band or a component carrier (CC) included in the downlink-dedicated band may also be referred to as a supplemental downlink, a supplemental downlink spectrum, or a supplemental downlink channel.

Alternatively, the DL only cell may be a cell of a band other than the downlink-dedicated band or may be a cell used only for the DL without being used for the UL by the operator.

Base Station

For example, the DL only cell is a cell of another base station different from the base station 100. For example, the DL only cell has a coverage overlapping the coverage 11 of the cell of the base station 100. Specifically, for example, the DL only cell is the small cell of the neighbor base station 200 with the coverage 51.

This, for example, enables the base station 100 to determine initiation or termination of the MDT measurements for the cell of the other base station having a coverage overlapping the coverage 11.

(c) Reporting

For example, the reporting is measurement reporting. In other words, the reporting is the measurement reporting performed by the terminal apparatus 300 to the base station 100, the measurement reporting being used for determining initiation or termination of the MDT measurements. The terminal apparatus 300 (reporting unit 335) performs the measurement reporting for the DL only cell based on the reporting condition information.

For example, events for triggering the reporting (reporting to be used for determining initiation or termination of the MDT measurements, or reporting for the DL only cell) are defined. Concrete examples of the events will be described later.

Note that the first exemplary embodiment is not limited to this example. In other words, the reporting may not be the measurement reporting, and be other kinds of reporting.

(d) Contents of Reporting Condition Information

Threshold

For example, the reporting condition information indicates the threshold to be compared with the measurement value (i.e., measurement result) of the DL only cell. In other words, the reporting condition information is threshold information indicating the threshold, or includes the threshold information. For example, the measurement value is receive power or receive quality (e.g., RSRP or RSRQ) for the DL only cell. For example, the threshold is different from thresholds in normal measurement reporting (e.g., thresholds for measurement reporting events A1, A2, and A4) (i.e., threshold for MDT). As described above, for example, the reporting is the measurement reporting, the event triggering the reporting is defined, and the threshold is a threshold for the event. Concrete examples of the events will be described later.

This, for example, enables the terminal apparatus 300 to perform the reporting (e.g., measurement reporting) at the timing of entering the DL only cell or at the timing of moving out of the DL only cell.

Note that the reporting condition information may indicate a common threshold for both the determination of initiation of the MDT measurements and the determination of termination of the MDT measurements. Alternatively, the reporting condition information may indicate a threshold for the determination of initiation of the MDT measurements, and/or a threshold for the determination of termination of the MDT measurements.

DL Only Cell

The reporting condition information may indicate the DL only cell. In other words, the reporting condition information may further include the cell information indicating the DL only cell, in addition to the threshold information. Specifically, the reporting condition information (the cell information) may include the cell ID of the DL only cell, band information indicating the frequency band of the DL only cell, and/or frequency information indicating the frequency of the DL only cell. This, for example, enables the terminal apparatus 300 to easily find/detect a cell to be measured.

(e) Acquisition of Reporting Condition Information

First Example

As a first example, the network node 400 (information acquisition unit 431) acquires the reporting condition information. The network node 400 (communication processing unit 433) then transmits the reporting condition information to the base station 100. In this case, the base station 100 (information acquisition unit 141) acquires the reporting condition information transmitted by the network node 400. The network node 400 may store the reporting condition information in advance or may generate the reporting condition information by itself.

Specifically, for example, the network node 400 transmits an MDT configuration including the reporting condition information to the base station 100. The base station 100 (information acquisition unit 141) then acquires the MDT configuration including the reporting condition information.

This, for example, enables control of MDT measurements on the core network side.

Note that the MDT configuration may include information indicating the combination of the DL only cell and other cell(s) (in particular, a cell of another base station different from the base station using the DL only cell) which may be used as a primary cell. For example, this information may indicate the combination of the DL only cell (cell of neighbor base station 200) having the coverage 51, and the cell (cell of the base station 100) having the coverage 11, and may further indicate other combination(s).

Second Example

As a second example, the reporting condition information may be information transmitted to the base station 100 by the other base station (e.g., the neighbor base station 200).

Specifically, the network node 400 may transmit the MDT configuration including the reporting condition information to the neighbor base station 200, and the neighbor base station 200 (information acquisition unit 241) may acquire the MDT configuration. Thereafter, the neighbor base station 200 (communication processing module 243) may transmit the MDT configuration to the base station 100 (e.g., at the time of handover of the terminal apparatus 300 from the neighbor base station 200 to the base station 100). The base station 100 (information acquisition unit 141) may acquire the MDT configuration including the reporting condition information.

This, for example, enables the base station 100 to acquire the reporting condition information, even when the reporting condition information is not transmitted by the network node 400 to the base station 100.

Note that the MDT configuration may include information indicating the combination of the DL only cell and other cell(s) (in particular, a cell of another base station different from the base station using the DL only cell) which may be used as a primary cell. For example, this information may indicate the combination of the DL only cell (cell of neighboring base station 200) having the coverage 51, and the cell (cell of the base station 100) having the coverage 11, and may further indicate other combination(s).

Third Example

As a third example, the base station 100 may store the reporting condition information in advance or may generate the reporting condition information by itself. The base station 100 (information acquisition unit 141) may then acquire the reporting condition information.

(f) Transmission of Reporting Condition Information

For example, the base station 100 (communication processing unit 143) transmits a message including the reporting condition information to the terminal apparatus 300. The message is, for example, an RRC Connection Reconfiguration message or a Handover Command message. Alternatively, the message may be other kinds of message.

Note that, the base station 100 (communication processing unit 143) may transmit the reporting condition information in system information (e.g., system information block (SIB)) instead of a separate message to the terminal apparatus 300.

(g) Reporting and Determination of Initiation/Termination of MDT Measurements

As described above, the terminal apparatus 300 (reporting unit 335) performs the reporting (e.g., measurement reporting) for the DL only cell on the basis of the reporting condition information, and the base station 100 (control unit 145) determines initiation or termination of the MDT measurements in response to the reporting. It is needless to say, that the terminal apparatus 300 (measurement unit 333) performs the measurements for the DL only cell before the reporting.

As described above, for example, the reporting condition information indicates the threshold to be compared with the measurement value (i.e., measurement result) of the DL only cell. For example, the measurement value is receive power or receive quality (e.g., RSRP or RSRQ) for the DL only cell.

First Example (Determination of Initiation of MDT Measurements)

As a first example, the conditions of the reporting include that the measurement value is better than the threshold. In this case, for example, the terminal apparatus 300 (reporting unit 335) performs the reporting (e.g., measurement reporting) for the DL only cell when the measurement value is better than the threshold. The base station 100 (control unit 145) then determines initiation of the MDT measurements in response to the reporting.

As described above, for example, conditions that the reporting is the measurement reporting and the measurement value (i.e., measurement result) of the DL only cell is better than the threshold are defined as an event that triggers the reporting. More specifically for example, the following events (events different from events A1 to A6 and B1 and B2 for the measurement reporting) may be defined.

$$Mn-Hys>Thresh$$

Mn is the measurement result of a neighboring cell (i.e., the DL only cell), not taking into account any offsets.

Hys is a hysteresis parameter for this event.

Thresh is a threshold parameter for this event (i.e., the threshold).

Mn is expressed in dBm in case of RSRP, or in dB in case of RSRQ.

Hys is expressed in dB.

Thresh is expressed in the same unit as Mn.

With reference to FIG. 1 again, for example, the terminal apparatus 300 moves in the coverage 11, and enters the coverage 51 of the DL only cell from the outside of the coverage 51 (i.e., enters the area 53 which is the unavailable coverage). In this situation, the measurement value of the DL only cell in the terminal apparatus 300 is better than the threshold (i.e., an event occurs), and the terminal apparatus 300 performs the measurement reporting for the DL only cell. The base station 100 then determines initiation of the MDT measurements in response to the measurement reporting.

This causes, for example, the terminal apparatus 300 to initiate the MDT measurements in the coverage 11, at the timing of entering the coverage of the DL only cell (i.e., unavailable coverage). Therefore, the information regarding the unavailable coverage may be collected efficiently.

Second Example (Determination of Termination of MDT Measurements)

As a second example, the conditions of the reporting include that the measurement value is worse than the threshold. In this case, for example, the terminal apparatus 300 (reporting unit 335) performs the reporting (e.g., measurement reporting) for the DL only cell when the measurement value is worse than the threshold. The base station 100 (control unit 145) then determines termination of the MDT measurements in response to the reporting.

As described above, for example, conditions that the reporting is the measurement reporting and the measurement value (i.e., measurement result) of the DL only cell is worse than the threshold are defined as an event that triggers the reporting. More specifically for example, the following events (events different from events A1 to A6 and B1 to B2 for the measurement reporting) may be defined.

$$Mn-Hys<Thresh$$

Mn is the measurement result of a neighboring cell (i.e., the DL only cell), not taking into account any offsets.

Hys is a hysteresis parameter for this event.

Thresh is a threshold parameter for this event (i.e., the threshold).

Mn is expressed in dBm in case of RSRP, or in dB in case of RSRQ.

Hys is expressed in dB.

Thresh is expressed in the same unit as Mn.

With reference to FIG. 1 again, for example, the terminal apparatus 300 moves in the coverage 11, and moves out of the coverage 51 of the DL only cell from the coverage 51 (i.e., moves out of the area 53 which is the unavailable coverage). In this situation, the measurement value of the DL only cell in the terminal apparatus 300 is worse than the threshold (i.e., an event occurs), and the terminal apparatus 300 performs the measurement reporting for the DL only cell. The base station 100 then determines termination of the MDT measurements in response to the measurement reporting.

This causes, for example, the terminal apparatus 300 to terminate the MDT measurements in the coverage 11, at the timing of moving out of the coverage of the DL only cell (i.e., unavailable coverage). Therefore, the information regarding the unavailable coverage may be collected efficiently.

For example, as described above, the base station 100 transmits the reporting condition information to the terminal apparatus 300, and the terminal apparatus 300 performs the reporting (e.g., measurement reporting) for the DL only cell on the basis of the reporting condition information. Furthermore, for example, the base station 100 determines initiation or termination of the MDT measurements in response to the reporting. With these processes, for example, the terminal apparatus 300 initiates the MDT measurements in the coverage 11 at the timing of entering the coverage of the DL only cell (i.e., unavailable coverage), and/or terminates the MDT measurements at the timing of moving out of the coverage of the DL only cell (i.e., unavailable coverage). Therefore, the information regarding the unavailable coverage may be collected efficiently.

(1-2) Determination in Response to Handover

For example, the base station 100 (control unit 145) determines initiation or termination of the MDT measurements for the DL only cell in response to a handover of the terminal apparatus 300.

(a) First Example (Determination of Initiation of MDT Measurements)

As a first example, the base station 100 (control unit 145) determines initiation of the MDT measurements in response to the handover of the terminal apparatus 300 from the other base station (e.g., neighbor base station 200) using the DL only cell to the base station 100. For example, the base station 100 (control unit 145) determines initiation of the MDT measurements in response to the handover when the measurement value of the DL only cell in the terminal apparatus 300 is better than the threshold. The threshold may be included, for example, in the MDT configuration transmitted by the network node 400, or may be the same as or different from the threshold indicated by the reporting condition information.

With reference to FIG. 1 again, for example, the terminal apparatus 300 moves to the area in which the coverage 11 and the coverage 51 overlap with each other (i.e., the area 53), from the area in which the coverage 21 and the coverage 51 overlap with each other. As a result, the handover of the terminal apparatus 300 from the neighbor base station 200 to the base station 100 is performed. In addition, the terminal apparatus 300 is in the DL only cell having the coverage 51, and therefore the measurement value of the DL only cell in the terminal apparatus 300 is better than the threshold. Therefore, the base station 100 determines initiation of the MDT measurements for the DL only cell in response to the handover.

This causes, for example, the terminal apparatus 300 to initiate the MDT measurements in the coverage of the DL only cell, at the timing of entering the coverage 11 (i.e., unavailable coverage). Therefore, the information regarding the unavailable coverage may be collected efficiently.

Note that the base station 100 (control unit 145) may determine whether the measurement value (i.e., measurement value of the DL only cell in the terminal apparatus 300) is better than the threshold. In this case, the neighbor base station 200 (communication processing unit 243) may transmit the measurement value to the base station 100 (e.g., at the time of handover of the terminal apparatus 300 from the neighbor base station 200 to the base station 100). Alternatively, the neighbor base station 200 (communication processing unit 243) may determine whether the measurement value is better than the threshold, and may transmit the result of the determination to the base station 100 (e.g., at the time of handover of the terminal apparatus 300 from the neighbor base station 200 to the base station 100).

(b) Second Example (Determination of Termination of MDT Measurements)

As a second example, the base station 100 (control unit 145) determines termination of the MDT measurements for the DL only cell in response to the determination of the handover of the terminal apparatus 300 from to the base station 100 to the other base station (e.g., neighbor base station 200).

With reference to FIG. 1 again, for example, the terminal apparatus 300 moves from the coverage 11 (more specifically, the area 53 in which the coverage 11 and the coverage 51 overlap with each other) to the coverage 21. As a result, the base station 100 (control unit 145) determines the handover of the terminal apparatus 300 from the base station 100 to the neighbor base station 200. Therefore, the base station 100 determines termination of the MDT measurements for the DL only cell in response to the determination of the handover.

This causes, for example, the terminal apparatus 300 to terminate the MDT measurements in the coverage of the DL only cell, at the timing of moving out of the coverage 11 (i.e., unavailable coverage). Therefore, the information regarding the unavailable coverage may be collected efficiently.

(1-3) Determination in response to Expiration of Measurement Time Period

As a third example, the base station 100 (control unit 145) determines termination of the MDT measurements for the DL only cell, in response to expiration of a measurement time period.

For example, the MDT configuration transmitted by the network node 400 includes time period information indicating the measurement time period. The time period information may be information directly indicating the measurement time period (e.g., an index or a timer value corresponding to the measurement time period, or the like) or information indirectly indicating the measurement time period (e.g., the expiration time/expiration time point of the measurement time period).

For example, the base station 100 (control unit 145) observes expiration of the measurement time period after the determination or indication of initiation of the MDT measurements. As an example, the base station 100 (control unit 145) configures a timer, and observes expiration of the timer. When the measurement time period is finished (when the timer expires), the base station 100 (control unit 145) determines termination of the MDT measurements.

This may, for example, prevent the terminal apparatus 300 from continuing performing the MDT measurements when the terminal apparatus 300 remains in an unavailable coverage.

(2) Indication of Initiation/Termination of MDT Measurements

For example, the base station 100 (communication processing unit 143) transmits a message indicating initiation or termination of the MDT measurements to the terminal apparatus 300. With this process, the base station 100 indicates initiation or termination of the MDT measurements to the terminal apparatus 300.

For example, the message includes the cell information indicating the DL only cell. For example, the cell information includes the cell ID of the DL only cell, band information indicating the frequency band of the DL only cell, and/or frequency information indicating the frequency of the DL only cell.

As described as the first example, the base station 100 (control unit 145) determines initiation or termination of the MDT measurements for the DL only cell, on the basis of the reporting (e.g., measurement reporting) performed by the terminal apparatus 300 on the basis of the reporting condition information, for example. Alternatively, as described as the third example, the base station 100 (control unit 145) determines termination of the MDT measurements for the DL only cell, in response to expiration of the measurement time period, for example. In these cases, the base station 100 (communication processing unit 143) transmits an RRC Connection Reconfiguration message indicating initiation or termination of the MDT measurements to the terminal apparatus 300.

As described as the second example, the base station 100 (control unit 145) determines initiation or termination of the MDT measurements for the DL only cell in response to the determination of a handover of the terminal apparatus 300, for example. In these cases, the base station 100 (communication processing unit 143) transmits the Handover Command message indicating initiation or termination of the MDT measurements to the terminal apparatus 300. For example, when the handover is a handover from the neighbor base station 200 to the base station 100, the base station 100 (communication processing unit 143) transmits the Handover Command message indicating initiation of the MDT measurements to the terminal apparatus 300 via the neighbor base station 200. For example, when the handover is a handover from the base station 100 to the neighbor base station 200, the base station 100 (communication processing unit 143) directly transmits the Handover Command message indicating termination of the MDT measurements to the terminal apparatus 300.

This, for example, enables the terminal apparatus 300 to actually initiate or terminate the MDT measurements for the DL only cell.

(3) Initiation/Termination of MDT Measurements

For example, the terminal apparatus 300 (measurement unit 333) initiates or terminates the MDT measurements for the DL only cell, in response to the reception of a message indicating initiation or termination of the MDT measurements, the message being transmitted by the base station 100.

As described above, for example, the message includes information indicating DL only cell (e.g., cell ID of the DL only cell). As described above, for example, the message is an RRC Connection Reconfiguration message or a Handover Command message.

(4) Examples of Initiation/Termination of MDT Measurements

Figure 6:
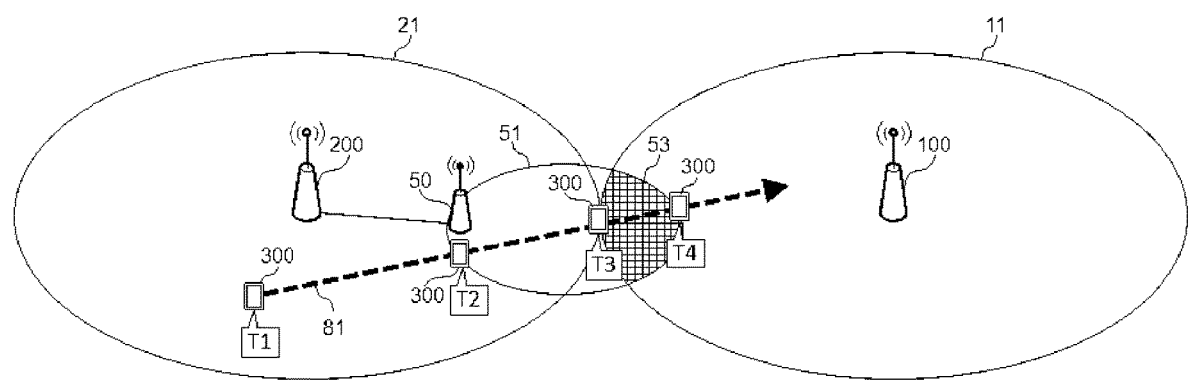
FIG. 6 is an explanatory diagram for describing a first example of initiation/termination of MDT measurements for DL only cell.
Figure 7:
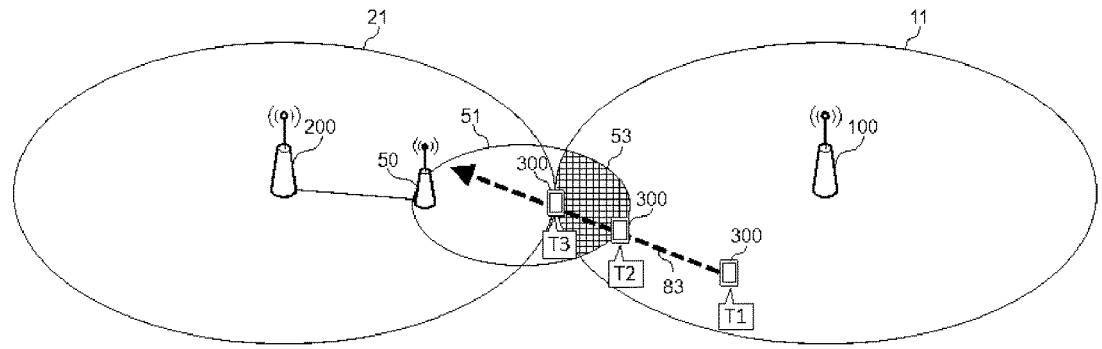
FIG. 7 is an explanatory diagram for describing a second example of initiation/termination of MDT measurements for DL only cell.

With reference to FIG. 6 and FIG. 7, a concrete example of initiation/termination of the MDT measurements for DL only cell is described.

(a) First Example

FIG. 6 is an explanatory diagram for describing a first example of initiation/termination of the MDT measurements for DL only cell. With reference to FIG. 6, as in FIG. 1, the base station 100, the neighbor base station 200, the remote unit 50 of the neighbor base station 200, and the terminal apparatus 300 are illustrated. The coverage 51 is the coverage of the DL only cell and includes the area 53, which is an unavailable coverage. In this example, the terminal apparatus 300 moves along a route 81.

At timing T1, the terminal apparatus 300 is in the connected mode and is connected to the neighbor base station 200.

At timing T2, the measurement value of the DL only cell in the terminal apparatus 300 is improved, and the terminal apparatus 300 performs the measurement reporting to the neighbor base station 200. For example, the neighbor base station 200 adds the DL only cell as a secondary cell of the terminal apparatus 300, in response to the measurement reporting.

At timing T3, a handover of the terminal apparatus 300 from the neighbor base station 200 to the base station 100 (i.e., a handover from the cell 21 to the cell 11) is performed. Moreover, the measurement value of the DL only cell is better than the threshold. Therefore, the base station 100 determines initiation of the MDT measurements for the DL only cell, and indicates the initiation of the MDT measurements to the terminal apparatus 300. The base station 100 transmits the reporting condition information to the terminal apparatus 300. The terminal apparatus 300 initiates the MDT measurements. After this, the terminal apparatus 300 performs the MDT measurements, and reports the results of the MDT measurements to the base station 100 (periodically or in response to occurrence of an event).

At timing T4, the measurement value of the DL only cell in the terminal apparatus 300 is worse than the threshold indicated by the reporting condition information, and the terminal apparatus 300 performs the measurement reporting for the DL only cell. The base station 100 determines termination of the MDT measurements for the DL only cell in response to the measurement reporting, and indicates the termination of the MDT measurements to the terminal apparatus 300. The terminal apparatus 300 terminates the MDT measurements.

(b) Second Example

FIG. 7 is an explanatory diagram for describing a second example of initiation/termination of MDT measurements for DL only cell. With reference to FIG. 7, as in FIG. 1, the base station 100, the neighbor base station 200, the remote unit 50 of the neighbor base station 200, and the terminal apparatus 300 are illustrated. The coverage 51 is the coverage of the DL only cell and includes the area 53, which is an unavailable coverage. In this example, the terminal apparatus 300 moves according to a route 83.

At timing T1, the terminal apparatus 300 is in the connected mode and is connected to the base station 100. The base station 100 transmits the reporting condition information to the terminal apparatus 300.

At timing T2, the measurement value of the DL only cell in the terminal apparatus 300 is better than the threshold indicated by the reporting condition information, and the terminal apparatus 300 performs the measurement reporting for the DL only cell. The base station 100 determines initiation of the MDT measurements for the DL only cell in response to the measurement reporting, and indicates the initiation of the MDT measurements to the terminal apparatus 300. The terminal apparatus 300 initiates the MDT measurements. After this, the terminal apparatus 300 performs the MDT measurements, and reports the results of the MDT measurements to the base station 100 (periodically or in response to occurrence of an event).

At timing T3, the base station 100 determines a handover of the terminal apparatus 300 from the base station 100 to the neighbor base station 200 (i.e., a handover from the cell 11 to the cell 21). Therefore, the base station 100 determines termination of the MDT measurements for the DL only cell, and indicates the termination of the MDT measurements to the terminal apparatus 300. The terminal apparatus 300 terminates the MDT measurements for the DL only cell.

As above, the terminal apparatus 300 may initiate the MDT measurements upon entering an unavailable coverage, and terminate the MDT measurements upon moving out of the unavailable coverage.

Note that when the measurement time period expires in a period from timing T2 to timing T3, the base station 100 determines the termination of the MDT measurements in response to the expiration.

(5) Flow of Processing

Figure 8:
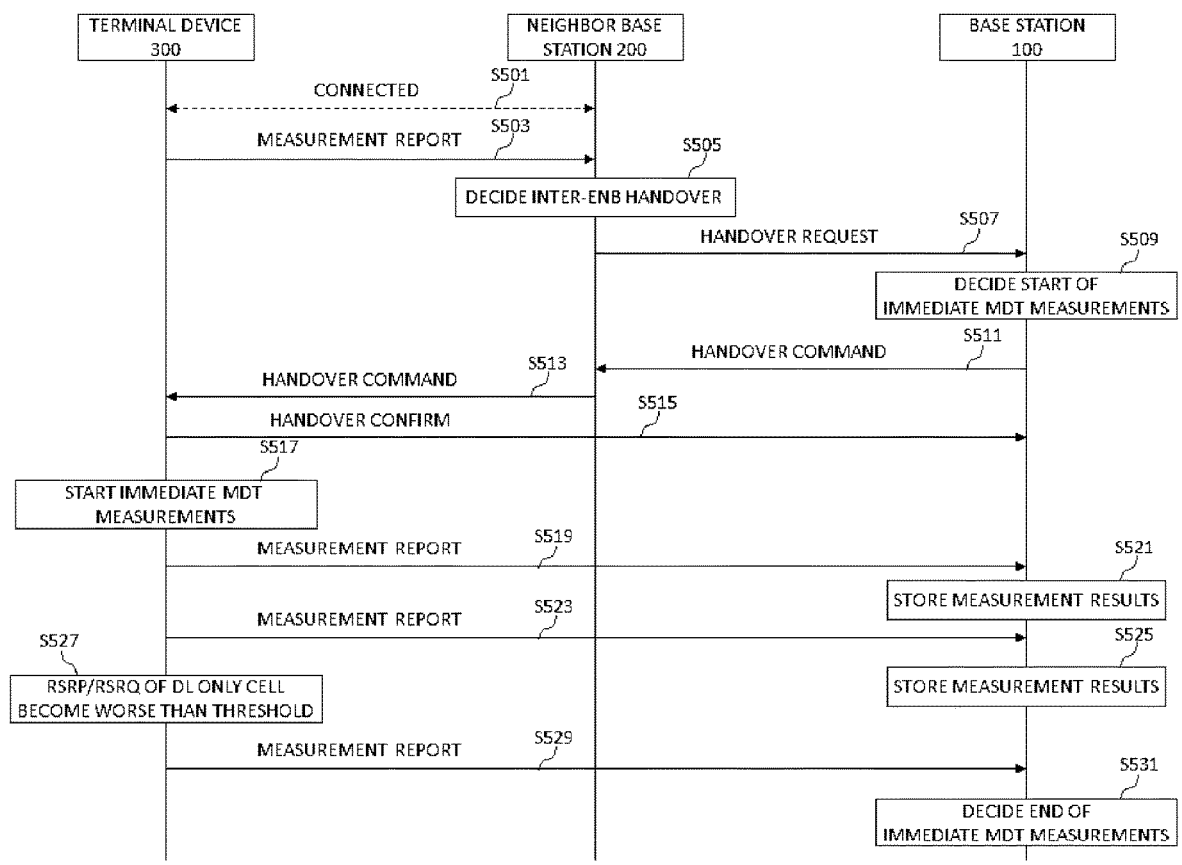
FIG. 8 is a sequence diagram illustrating a first example of a schematic flow of processing by the base station and the terminal apparatus according to the first exemplary embodiment.
Figure 9:
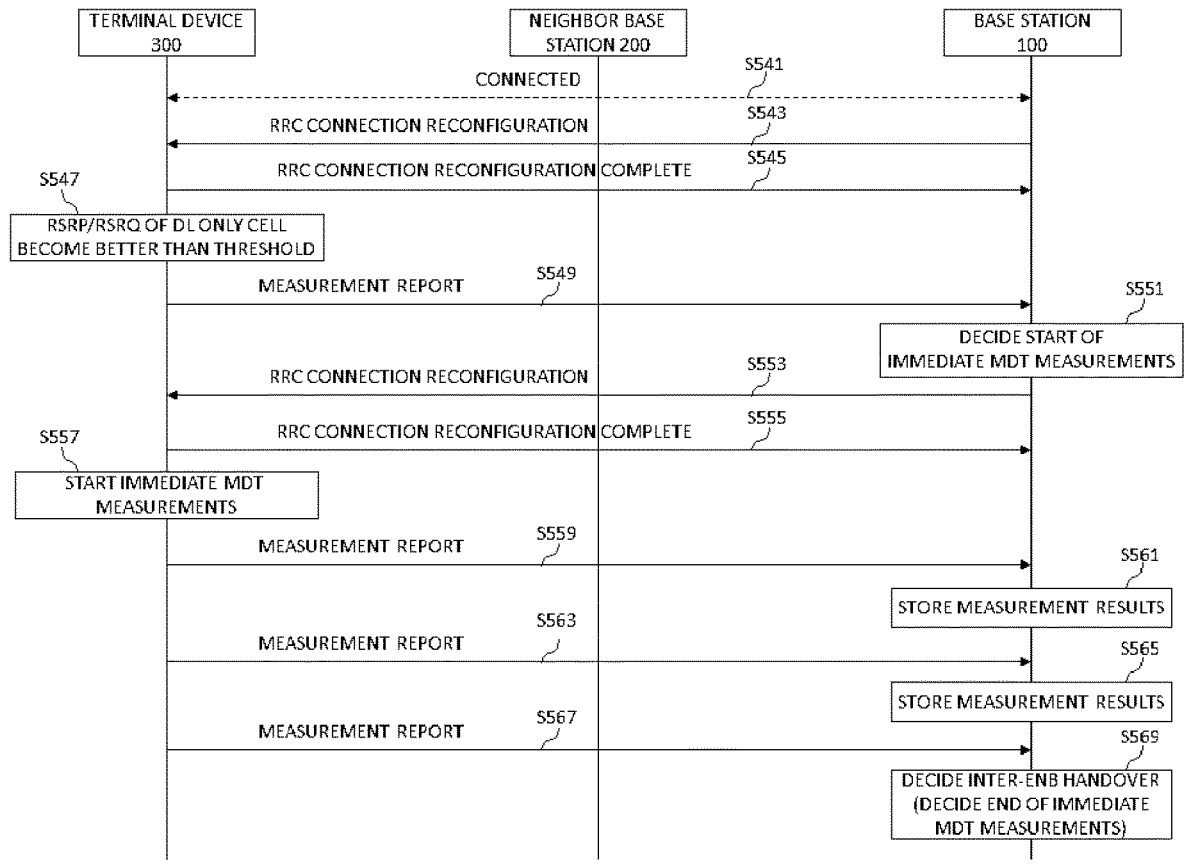
FIG. 9 is a sequence diagram illustrating a second example of a schematic flow of processing by the base station and the terminal apparatus according to the first exemplary embodiment.
Figure 10:
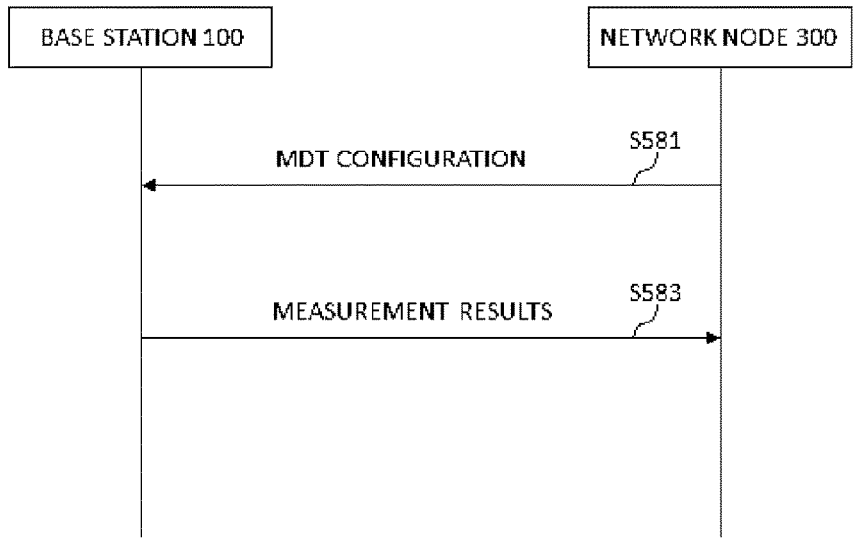
FIG. 10 is a sequence diagram illustrating an example of a schematic flow of processing by the base station and the network node according to the first exemplary embodiment.

With reference to FIG. 8 to FIG. 10, an example of a flow of processing according to the first exemplary embodiment is described.

(a) First Example

FIG. 8 is a sequence diagram illustrating a first example of a schematic flow of processing by the base station and the terminal apparatus according to the first exemplary embodiment. In the first example, the terminal apparatus 300 moves along the route 81 as illustrated in FIG. 6, for example.

The terminal apparatus 300 is connected to the neighbor base station 200 (S501). In other words, the terminal apparatus 300 is in the connected mode.

As for the results of measurements in the terminal apparatus 300, the result for the cell of the base station 100 having the coverage 11 is better than the result for the cell of the neighbor base station 200 having the coverage 21. Therefore, the terminal apparatus 300 performs the measurement reporting to the neighbor base station 200. In other words, the terminal apparatus 300 transmits a measurement report to the neighbor base station 200. For example, at timing T3 illustrated in FIG. 6, the terminal apparatus 300 performs such measurement reporting. Note that, for example, the measurement report transmitted by the terminal apparatus 300 includes not only the measurement value for the cell of the base station 100 having the coverage 11 but the measurement value for the DL only cell having the coverage 51.

The neighbor base station 200 determines a handover of the terminal apparatus 300 from the neighbor base station 200 to the base station 100 (i.e., a handover from the cell 21 to the cell 11) in response to the measurement reporting (S505). The handover is Inter-eNB Handover.

The neighbor base station 200 transmits a Handover Request message to the base station 100 (S507). This message includes the MDT configuration and the measurement value of the DL only cell. The MDT configuration is information transmitted by the network node 400 (to the neighbor base station 200, for example). The MDT configuration includes the reporting condition information.

The base station 100 determines initiation of the Immediate MDT measurements for the DL only cell when the measurement value of the DL only cell is better than the threshold (S509). This is because the terminal apparatus 300 is assumed to be located in the DL only cell after the handover (i.e., located in the unavailable coverage). Note that the threshold may be the same as the threshold indicated by the reporting condition information, or may be different from the threshold (e.g., may be a threshold indicated by other information included in the MDT configuration).

The base station 100 acquires the reporting condition information included in the MDT configuration, and transmits a Handover Command message including the reporting condition information to the neighbor base station 200 (S511). The neighbor base station 200 transmits the Handover Command message to the terminal apparatus 300 (S513). The reporting condition information indicates the threshold to be compared with the measurement value of the DL only cell. The reporting condition information may further indicate the DL only cell. Alternatively, the reporting condition information does not indicate the DL only cell, but the Handover Command message may include other information indicating the DL only cells.

The terminal apparatus 300 transmits a Handover Confirm message to the base station 100 (S515), and initiates the Immediate MDT measurements for the DL only cell (S517). The base station 100 initiates observation of expiration of the measurement time period.

The terminal apparatus 300 performs the Immediate MDT measurements, and transmits measurement report(s) including the measurement results to the base station 100 (S519, S523). The base station 100 stores the measurement results (S521, S525).

After that, each of the measurement values (RSRP/RSRQ) of the DL only cell becomes worse than the threshold indicated by the reporting condition information (S527). Accordingly, the terminal apparatus 300 performs the measurement reporting for the DL only cell (S529). In other words, the terminal apparatus 300 transmits a measurement report for the DL only cell to the base station 100. For example, at timing T4 illustrated in FIG. 6, the terminal apparatus 300 performs such measurement reporting.

The base station 100 determines termination of the Immediate MDT measurements in response to the measurement reporting performed by the terminal apparatus 300 (S531). After that, the base station 100 may transmit a message (e.g., an RRC Connection Reconfiguration message) indicating termination of the Immediate MDT measurements to the terminal apparatus 300.

As above, the first example of a schematic flow of processing by the base station and the terminal apparatus according to the first exemplary embodiment has been described.

Note that the measurement time period may expire in some cases before the measurement value becomes worse than the threshold as in step S527. In other words, the terminal apparatus 300 may stay in the unavailable coverage for a longer time than the measurement time period. Also in this case, the base station 100 determines termination of the Immediate MDT measurements in response to expiration of the measurement time period.

Moreover, the handover from the base station 100 to the neighbor base station 200 may be performed before the measurement value becomes worse than the threshold as in step S527. In other words, the terminal apparatus 300 may return from the coverage 11 of the cell of the base station 100 to the coverage 21 of the cell of the neighbor base station 200. Also in this case, the base station 100 determines termination of the Immediate MDT measurements in response to handover.

(b) Second Example

FIG. 9 is a sequence diagram illustrating a second example of a schematic flow of processing by the base station and the terminal apparatus according to the first exemplary embodiment. In the second example, the terminal apparatus 300 moves along the route 83 as illustrated in FIG. 7, for example.

First, the terminal apparatus 300 is connected to the base station 100 (S541). In other words, the terminal apparatus 300 is in the connected mode.

The base station 100 acquires the reporting condition information included in the MDT configuration, and transmits an RRC Connection Reconfiguration message including the reporting condition information to the terminal apparatus 300 (S543). The reporting condition information indicates the threshold to be compared with the measurement value of the DL only cell. The reporting condition information may further indicate the DL only cell. Alternatively, the reporting condition information does not indicate the DL only cell, but the RRC Connection Reconfiguration message may include other information indicating the DL only cells.

The terminal apparatus 300 transmits an RRC Connection Reconfiguration Complete message to the base station 100 (S545). The base station 100 initiates observation of expiration of a first measurement time period.

After that, each of the measurement values (RSRP/RSRQ) of the DL only cell becomes better than the threshold indicated by the reporting condition information (S547). Accordingly, the terminal apparatus 300 performs the measurement reporting for the DL only cell (S549). In other words, the terminal apparatus 300 transmits a measurement report for the DL only cell to the base station 100. For example, at timing T2 illustrated in FIG. 7, the terminal apparatus 300 performs such measurement reporting.

The base station 100 determines initiation of the Immediate MDT measurements for the DL only cell in response to the measurement reporting performed by the terminal apparatus 300 (S551). The base station 100 transmits an RRC Connection Reconfiguration message indicating initiation of the Immediate MDT measurements to the terminal apparatus 300 (S553). The RRC Connection Reconfiguration message includes cell information indicating the DL only cells.

The terminal apparatus 300 transmits an RRC Connection Reconfiguration Complete message to the base station 100 (S555), and initiates the Immediate MDT measurements for the DL only cell (S557). The base station 100 initiates observation of expiration of a second measurement time period. The second measurement time period may be the same as or may be different from the first measurement time period.

The terminal apparatus 300 performs the Immediate MDT measurements, and transmits measurement report(s) including the measurement results to the base station 100 (S559, S563). The base station 100 stores the measurement results (S561, S565).

As for the results of measurements in the terminal apparatus 300, the result for the cell of the neighbor base station 200 having the coverage 21 is better than the result for the cell of the base station 100 having the coverage 11. Therefore, the terminal apparatus 300 performs the measurement reporting to the base station 100 (S567). In other words, the terminal apparatus 300 transmits a measurement report to the base station 100. For example, at timing T3 illustrated in FIG. 7, the terminal apparatus 300 performs such measurement reporting.

The base station 100 determines a handover of the terminal apparatus 300 from the base station 100 to the neighbor base station 200 (i.e., a handover from the cell 11 to the cell 21) in response to the measurement reporting (S569). The handover is Inter-eNB Handover. After that, the base station 100 may transmit a message (e.g., Handover Command) indicating termination of the Immediate MDT measurements to the terminal apparatus 300.

As above, the second example of a schematic flow of processing by the base station and the terminal apparatus according to the first exemplary embodiment has been described.

Note that the first measurement time period may expire in some cases before the measurement value of the DL only cell becomes better than the threshold indicated by the reporting condition information as in step S547. In other words, the terminal apparatus 300 may not enter the unavailable coverage even when the first measurement time period expires. In such a case, the base station 100 gives up execution of the Immediate MDT measurements by the terminal apparatus 300.

Note that the second measurement time period may expire in some cases before the base station 100 determines the handover as in step S569. In other words, the terminal apparatus 300 may stay in the unavailable coverage for a longer time than the second measurement time period. Also in this case, the base station 100 determines termination of the Immediate MDT measurements in response to expiration of the second measurement time period.

Note that each of the measurement values (RSRP/RSRQ) of the DL only cell becomes worse than the threshold indicated by the reporting condition information in some cases before the base station 100 determines the handover as in step S569. In other words, the terminal apparatus 300 may move out of the coverage 51 of the DL only cell. Also in this case, the base station 100 determines termination of the Immediate MDT measurements.

(c) Others

FIG. 10 is a sequence diagram illustrating an example of a schematic flow of processing by the base station 100 and the network node 400 according to the first exemplary embodiment.

The network node 400 transmits an MDT configuration to the base station 100 (S581). For example, the MDT configuration includes the reporting condition information and the time period information.

Thereafter, the base station 100, the neighbor base station 200 and the terminal apparatus 300 perform processing as that described with reference to FIG. 8 or FIG. 9.

The base station 100 then reports the results of the MDT measurements reported by the terminal apparatus 300, to the network node 400 (S583).

Note that, the base station 100 may report the results of the MDT measurements to a different network node from the network node 400.

5. Second Exemplary Embodiment

Next, a second exemplary embodiment of the present invention is described with reference to FIG. 11 to FIG. 13.

5.1. Example of Configuration of Base Station

Figure 11:
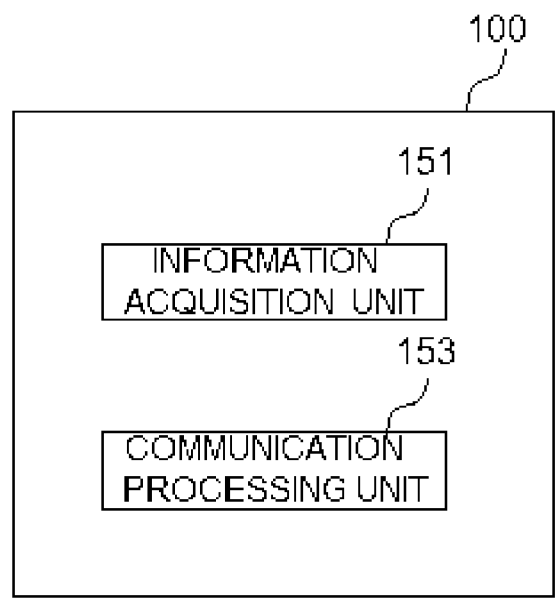
FIG. 11 is a block diagram illustrating an example of a schematic configuration of a base station according to a second exemplary embodiment.

First, with reference to FIG. 11, an example of a configuration of a base station 100 according to the second exemplary embodiment is described. FIG. 11 is a block diagram illustrating an example of a schematic configuration of the base station 100 according to the second exemplary embodiment. With reference to FIG. 11, the base station 100 includes an information acquisition unit 151 and a communication processing unit 153.

Concrete operations of the information acquisition unit 151 and the communication processing unit 153 will be described later.

The information acquisition unit 151 and the communication processing unit 153 may be implemented by a baseband (BB) processor and/or another processor, or the like.

5.2. Example of Configuration of Terminal Apparatus

Figure 12:
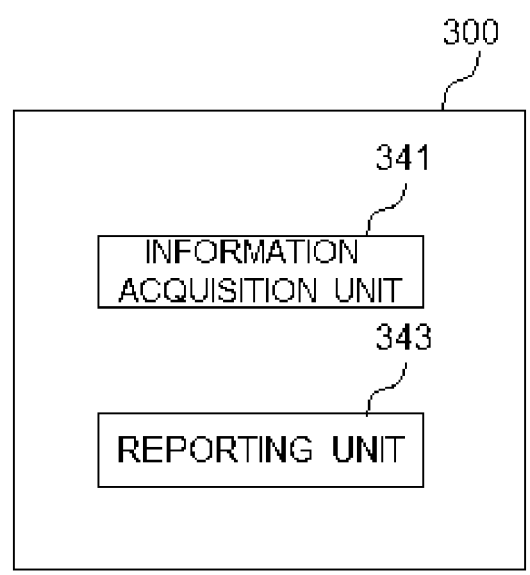
FIG. 12 is a block diagram illustrating an example of a schematic configuration of a terminal apparatus according to the second exemplary embodiment.

Next, with reference to FIG. 12, an example of a configuration of a terminal apparatus 300 according to the second exemplary embodiment is described. FIG. 12 is a block diagram illustrating an example of a schematic configuration of the terminal apparatus 300 according to the second exemplary embodiment. With reference to FIG. 12, the terminal apparatus 300 includes an information acquisition unit 341 and a reporting unit 343.

Concrete operations of the information acquisition unit 341 and the reporting unit 343 will be described later.

The information acquisition unit 341 and the reporting unit 343 may be implemented by a baseband (BB) processor and/or another processor, or the like.

5.3. Technical Features

Next, technical features of the second exemplary embodiment are described with reference to FIG. 13.

(1) Reporting Condition Information

The base station 100 (information acquisition unit 151) acquires reporting condition information regarding a condition of reporting performed by the terminal apparatus 300 to the base station 100. The base station 100 (communication processing unit 153) then transmits the reporting condition information to the terminal apparatus 300. In particular, the reporting is reporting to be used for determining initiation or termination of the MDT measurements for the DL only cell.

The terminal apparatus 300 (information acquisition unit 341) acquires the reporting condition information. The terminal apparatus 300 (reporting unit 343) performs reporting for the DL only cell based on the reporting condition information.

Descriptions for "MDT measurements", "DL only cell", "reporting", "contents of reporting condition information", "acquisition of reporting condition information", "transmission of reporting condition information", and "reporting and determination of initiation/termination of MDT measurements" are the same as those in the first exemplary embodiment except for, for example, the differences in reference sign (i.e., the difference between the information acquisition unit 151 and the information acquisition unit 141, the difference between the communication processing unit 153 and the communication processing unit 143, the difference between the information acquisition unit 341 and the information acquisition unit 331, and the difference between the reporting unit 343 and the reporting unit 335). Hence, overlapping descriptions are omitted here.

(2) Flow of Processing

Figure 13:
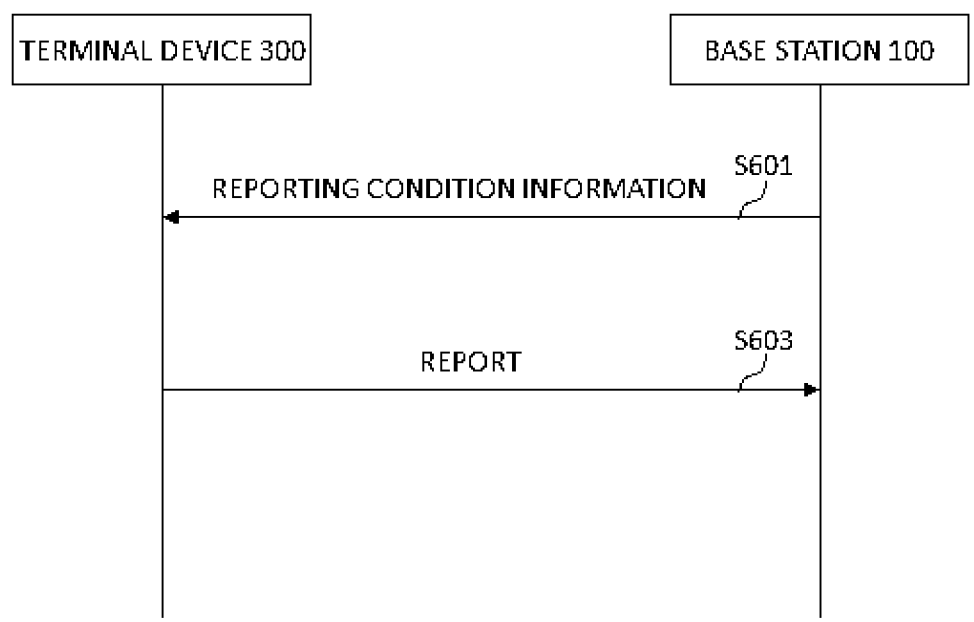
FIG. 13 is a sequence diagram illustrating an example of a schematic flow of processing by the base station and the terminal apparatus according to the second exemplary embodiment.

With reference to FIG. 13, an example of a flow of processing according to the second exemplary embodiment is described. FIG. 13 is a sequence diagram illustrating an example of a schematic flow of processing by the base station 100 and the terminal apparatus 300 according to the second exemplary embodiment.

The base station 100 acquires reporting condition information regarding a condition of reporting performed by the terminal apparatus 300 to the base station 100, and transmits the reporting condition information to the terminal apparatus 300 (S601). The reporting is reporting to be used for determining initiation or termination of the MDT measurements for the DL only cell.

The terminal apparatus 300 acquires the reporting condition information, and performs reporting for the DL only cell on the basis of the reporting condition information.

The exemplary embodiments of the present invention have been described above. The present invention is not limited to the above-described exemplary embodiments and is possible to be implemented by making various changes within the scope of the gist of the present invention. The above-described exemplary embodiments are examples, and it should be understood by those skilled in the art that various modified examples can be made to combinations of the exemplary embodiments and combinations of constituent components and processing processes of the exemplary embodiments and that such modified examples are also within the scope of the present invention.

For example, although the descriptions have been given mainly on the basis of the examples in which a DL only cell is a small cell, the present invention is not limited to these examples. For example, the DL only cell may be a macro cell.

Moreover, for example, the expression that a "measurement value is better than a threshold" may be rephrased as a "measurement value is larger than a threshold", and the expression that a "measurement value is worse than a threshold" may be rephrased as a "measurement value is smaller than a threshold".

Moreover, for example, the steps in any processing described in the present description need not be performed chronologically in the order illustrated in the corresponding sequence diagram. For example, the steps of the processing may be performed in a different order from the order illustrated as the corresponding sequence diagram or may be performed in parallel.

Moreover, a base station apparatus (e.g., an apparatus including a base band unit (BBU) or a BBU) including constituent elements (e.g., the information acquisition unit, the communication processing unit and/or the control unit) of any base station described herein, or a module of the base station apparatus (e.g., a BBU or a BBU module) may be provided. A module including the constituent elements (e.g., the information acquisition unit, the measurement unit, and/or the reporting unit) of any terminal apparatus described herein may be provided. A module including the constituent elements (e.g., the information acquisition unit and/or the communication processing unit) of any network node described herein may be provided. Methods including processing by such constituent elements may be provided, and programs for causing processor(s) to execute the processing of such constituent elements may be provided. Recording medium or media recording all of or any of the programs may be provided. It is apparent that such a base station, modules, methods, programs, and recording media are also included in the present invention.

Some of or all the above-described exemplary embodiments can be described as in the following Supplementary Notes, but are not limited to the following.

(Supplementary Note 1)

An apparatus comprising:

an information acquisition unit configured to acquire reporting condition information regarding a condition of reporting performed by a terminal apparatus to a base station; and a communication processing unit configured to transmit the reporting condition information to the terminal apparatus, wherein the reporting is reporting to be used for determining initiation or termination of Minimization of Drive Tests (MDT) measurements for a downlink only cell.

(Supplementary Note 2)

The apparatus according to Supplementary Note 1, further comprising a control unit configured to determine initiation or termination of the MDT measurements, in response to the reporting performed by the terminal apparatus based on the reporting condition information.

(Supplementary Note 3)

The apparatus according to Supplementary Note 2, wherein the communication processing unit is configured to transmit, to the terminal apparatus, a message indicating initiation or termination of the MDT measurements.

(Supplementary Note 4)

The apparatus according to any one of Supplementary Notes 1 to 3, wherein the reporting condition information indicates a threshold to be compared with a measurement value of the downlink only cell.

(Supplementary Note 5)

The apparatus according to Supplementary Note 4, wherein the condition of the reporting includes that the measurement value is better than the threshold or that the measurement value is worse than the threshold.

(Supplementary Note 6)

The apparatus according to Supplementary Note 4 or 5, further comprising a control unit configured to determine initiation of the MDT measurements, in response to the reporting performed by the terminal apparatus when the measurement value is better than the threshold.

(Supplementary Note 7)

The apparatus according to any one of Supplementary Notes 4 to 6, further comprising a control unit configured to determine termination of the MDT measurements, in response to the reporting performed by the terminal apparatus when the measurement value is worse than the threshold.

(Supplementary Note 8)

The apparatus according to any one of Supplementary Notes 1 to 7, wherein the reporting condition information indicates the downlink only cell.

(Supplementary Note 9)

The apparatus according to any one of Supplementary Notes 1 to 8, wherein the apparatus is the base station, a base station apparatus for the base station, or a module for the base station apparatus.

(Supplementary Note 10)

The apparatus according to Supplementary Note 9, wherein the downlink only cell is a cell of another base station different from the base station.

(Supplementary Note 11)

The apparatus according to Supplementary Note 10, wherein the reporting condition information is information transmitted by the other base station to the base station.

(Supplementary Note 12)

The apparatus according to Supplementary Note 10 or 11, further comprising a control unit configured to determine initiation of the MDT measurements, in response to a handover of the terminal apparatus to the base station from the other base station.

(Supplementary Note 13)

The apparatus according to Supplementary Note 12, wherein the control unit is configured to determine initiation of the MDT measurements, in response to the handover when a measurement value of the downlink only cell in the terminal apparatus is better than a threshold.

(Supplementary Note 14)

The apparatus according to any one of Supplementary Notes 10 to 13, further comprising a control unit configured to determine termination of the MDT measurements, in response to determination of a handover of the terminal apparatus from the base station to the other base station.

(Supplementary Note 15)

The apparatus according to any one of Supplementary Notes 1 to 14, further comprising a control unit configured to determine termination of the MDT measurements, in response to expiration of a measurement time period.

(Supplementary Note 16)

An apparatus comprising:

an information acquisition unit configured to acquire reporting condition information regarding a condition of reporting performed by a terminal apparatus to a base station, the reporting condition information being transmitted by the base station; and a reporting unit configured to perform reporting for a downlink only cell based on the reporting condition information, wherein the reporting is reporting to be used for determining initiation or termination of MDT measurements for the downlink only cell.

(Supplementary Note 17)

The apparatus according to Supplementary Note 16, wherein the reporting condition information indicates a threshold to be compared with a measurement value of the downlink only cell, and the reporting unit performs the reporting for the downlink only cell when the measurement value is better than the threshold.

(Supplementary Note 18)

The apparatus according to Supplementary Note 16 or 17, wherein the reporting condition information indicates a threshold to be compared with a measurement value of the downlink only cell, and the reporting unit performs the reporting for the downlink only cell when the measurement value is worse than the threshold.

(Supplementary Note 19)

The apparatus according to any one of Supplementary Notes 16 to 18, further comprising a measurement unit configured to initiate or terminate the MDT measurements, in response to reception of a message indicating initiation or termination of the MDT measurements, the message being transmitted by the base station.

(Supplementary Note 20)

An apparatus comprising:

an information acquisition unit configured to acquire reporting condition information regarding a condition of reporting performed by a terminal apparatus to a base station; and a communication processing unit configured to transmit the reporting condition information to the base station, wherein the reporting is reporting to be used for determining initiation or termination of MDT measurements for a downlink only cell.

(Supplementary Note 21)

The apparatus according to any one of Supplementary Notes 1 to 20, wherein the MDT measurements are MDT measurements in a connected mode.

(Supplementary Note 22)

The apparatus according to Supplementary Note 21, wherein the MDT measurements are Immediate MDT measurements.

(Supplementary Note 23)

The apparatus according to any one of Supplementary Notes 1 to 22, wherein the downlink only cell is a cell in a downlink-dedicated band.

(Supplementary Note 24)

The apparatus according to Supplementary Note 23, wherein the downlink-dedicated band is Band 29 or Band 32.

(Supplementary Note 25)

The apparatus according to any one of Supplementary Notes 1 to 24, wherein the reporting is measurement reporting.

(Supplementary Note 26)

A method including:

acquiring reporting condition information regarding a condition of reporting performed by a terminal apparatus to a base station; and transmitting the reporting condition information to the terminal apparatus, wherein the reporting is reporting to be used for determining initiation or termination of MDT measurements for a downlink only cell.

(Supplementary Note 27)

A method including:

acquiring reporting condition information regarding a condition of reporting performed by a terminal apparatus to a base station, the reporting condition information being transmitted by the base station; and performing reporting for a downlink only cell based on the reporting condition information, wherein the reporting is reporting to be used for determining initiation or termination of MDT measurements for the downlink only cell.

(Supplementary Note 28)

A method including:

acquiring reporting condition information regarding a condition of reporting performed by a terminal apparatus to a base station; and transmitting the reporting condition information to the base station, wherein the reporting is reporting to be used for determining initiation or termination of MDT measurements for a downlink only cell.

(Supplementary Note 29)

A system including:

a base station configured to transmit, to a terminal apparatus, reporting condition information regarding a condition of reporting performed by the terminal apparatus to the base station; and the terminal apparatus configured to perform reporting for a downlink only cell based on the reporting condition information, wherein the reporting is reporting to be used for determining initiation or termination of MDT measurements for the downlink only cell.

(Supplementary Note 30)

A method including:

transmitting, from a base station to a terminal apparatus, reporting condition information regarding a condition of reporting performed by the terminal apparatus to the base station; and performing, in the terminal apparatus, reporting for a downlink only cell based on the reporting condition information, wherein the reporting is reporting to be used for determining initiation or termination of MDT measurements for the downlink only cell.

(Supplementary Note 31)

A program causing a processor to execute:

acquiring reporting condition information regarding a condition of reporting performed by a terminal apparatus to a base station; and transmitting the reporting condition information to the terminal apparatus, wherein the reporting is reporting to be used for determining initiation or termination of MDT measurements for a downlink only cell.

(Supplementary Note 32)

A readable recording medium storing a program causing a processor to execute:

acquiring reporting condition information regarding a condition of reporting performed by a terminal apparatus to a base station; and transmitting the reporting condition information to the terminal apparatus, wherein the reporting is reporting to be used for determining initiation or termination of MDT measurements for a downlink only cell.

(Supplementary Note 33)

A program causing a processor to execute:

acquiring reporting condition information regarding a condition of reporting performed by a terminal apparatus to a base station, the reporting condition information being transmitted by the base station; and performing reporting for a downlink only cell based on the reporting condition information, wherein the reporting is reporting to be used for determining initiation or termination of MDT measurements for the downlink only cell.

(Supplementary Note 34)

A readable recording medium storing a program causing a processor to execute:

acquiring reporting condition information regarding a condition of reporting performed by a terminal apparatus to a base station, the reporting condition information being transmitted by the base station; and performing reporting for a downlink only cell based on the reporting condition information, wherein the reporting is reporting to be used for determining initiation or termination of MDT measurements for the downlink only cell.

(Supplementary Note 35)

A program causing a processor to execute:

acquiring reporting condition information regarding a condition of reporting performed by a terminal apparatus to a base station; and transmitting the reporting condition information to the base station, wherein the reporting is reporting to be used for determining initiation or termination of MDT measurements for a downlink only cell.

(Supplementary Note 36)

A readable recording medium storing a program causing a processor to execute:

acquiring reporting condition information regarding a condition of reporting performed by a terminal apparatus to a base station; and transmitting the reporting condition information to the base station, wherein the reporting is reporting to be used for determining initiation or termination of MDT measurements for a downlink only cell.

(Supplementary Note 37)

The apparatus according to any one of Supplementary Notes 16 to 19, wherein the apparatus is the terminal apparatus, or a module for the terminal apparatus.

(Supplementary Note 38)

The apparatus according to Supplementary Note 20, wherein the apparatus is a core network node, or a module for a core network node.

This application claims priority based on Japanese Patent Application No. 2015-179924 filed on Sep. 11, 2015, the entire disclosure of which is incorporated herein.

REFERENCE SIGNS LIST

1 System
11, 21, 51 (Cell) coverage
50 Remote unit
53 Area (unavailable coverage/unnecessary coverage)
60 Network
100 Base station
141, 151 Information acquisition unit
143, 153 Communication processing unit
145 Control unit
200 Neighbor base station
300 Terminal apparatus
331, 341 Information acquisition unit
333 Measurement unit
335, 343 Reporting unit
400 Network node
431 Information acquisition unit
433 Communication processing unit

What is claimed is:

1. An apparatus comprising:
a memory storing instructions; and
one or more processors configured to execute the instructions to:
acquire reporting condition information regarding a condition of reporting performed by a terminal apparatus to a base station; and
transmit the reporting condition information to the terminal apparatus,
wherein the reporting is reporting to be used for determining initiation or termination of Minimization of Drive Tests (MDT) measurements for a downlink only cell, and the reporting condition information indicates the downlink only cell.

2. The apparatus according to claim 1, the one or more processors are configured to execute the instructions to determine initiation or termination of the MDT measurements, in response to the reporting performed by the terminal apparatus based on the reporting condition information.

3. The apparatus according to claim 2, wherein the one or more processors are configured to execute the instructions to transmit, to the terminal apparatus, a message indicating initiation or termination of the MDT measurements.

4. The apparatus according to claim 1, wherein the reporting condition information indicates a threshold to be compared with a measurement value of the downlink only cell.

5. The apparatus according to claim 4, wherein the condition of the reporting includes that the measurement value is better than the threshold or that the measurement value is worse than the threshold.

6. The apparatus according to claim 4, the one or more processors are configured to execute the instructions to determine initiation of the MDT measurements, in response to the reporting performed by the terminal apparatus when the measurement value is better than the threshold.

7. The apparatus according to claim 4, the one or more processors are configured to execute the instructions to determine termination of the MDT measurements, in response to the reporting performed by the terminal apparatus when the measurement value is worse than the threshold.

8. The apparatus according to claim 1, wherein the apparatus is the base station, a base station apparatus for the base station, or a module for the base station apparatus.

9. The apparatus according to claim 8, wherein the downlink only cell is a cell of another base station different from the base station.

10. The apparatus according to claim 9, wherein the reporting condition information is information transmitted by the other base station to the base station.

11. The apparatus according to claim 9, the one or more processors are configured to execute the instructions to determine initiation of the MDT measurements, in response to a handover of the terminal apparatus to the base station from the other base station.

12. The apparatus according to claim 11, wherein the one or more processors are configured to execute the instructions to determine initiation of the MDT measurements, in response to the handover when a measurement value of the downlink only cell in the terminal apparatus is better than a threshold.

13. The apparatus according to claim 9, the one or more processors are configured to execute the instructions to determine termination of the MDT measurements, in response to determination of a handover of the terminal apparatus from the base station to the other base station.

14. The apparatus according to claim 1, the one or more processors are configured to execute the instructions to determine termination of the MDT measurements, in response to expiration of a measurement time period.

15. An apparatus comprising:
a memory storing instructions; and
one or more processors configured to execute the instructions to:
acquire reporting condition information regarding a condition of reporting performed by a terminal apparatus to a base station, the reporting condition information being transmitted by the base station; and perform reporting for a downlink only cell based on the reporting condition information, wherein the reporting is reporting to be used for determining initiation or termination of Minimization of Drive Tests (MDT) measurements for the downlink only cell, and the reporting condition information indicates the downlink only cell.

16. The apparatus according to claim 1, wherein the MDT measurements are MDT measurements in a connected mode.

17. The apparatus according to claim 16, wherein the MDT measurements are Immediate MDT measurements.

18. A method comprising:

acquiring reporting condition information regarding a condition of reporting performed by a terminal apparatus to a base station; and transmitting the reporting condition information to the terminal apparatus, wherein the reporting is reporting to be used for determining initiation or termination of Minimization of Drive Tests (MDT) measurements for a downlink only cell, and the reporting condition information indicates the downlink only cell.

19. The apparatus according to claim 15, wherein the apparatus is the terminal apparatus, or a module for the terminal apparatus.

* * * * *